(12) United States Patent
Wilson

(10) Patent No.: US 6,588,930 B2
(45) Date of Patent: Jul. 8, 2003

(54) FOOD MIXER WITH DETACHABLE HEAD

(76) Inventor: Ian Geoffrey Wilson, 40, Cobran Road, Cheltenham, New South Wales 2119 (AU)

(*) Notice: Subject to any disclaimer, the term of this patent is extended or adjusted under 35 U.S.C. 154(b) by 0 days.

(21) Appl. No.: 10/079,520

(22) Filed: Feb. 22, 2002

(65) Prior Publication Data

US 2002/0186615 A1 Dec. 12, 2002

(30) Foreign Application Priority Data

Jun. 12, 2001 (AU) .............................................. PR5611

(51) Int. Cl.[7] .................................................. B01F 7/16
(52) U.S. Cl. ........................ 366/199; 366/200; 366/206; 366/224
(58) Field of Search ..................... 366/92–95, 199–201, 366/206–207, 213–214, 222–224

(56) References Cited

U.S. PATENT DOCUMENTS

| 1,290,045 | A | * | 1/1919 | Bachman |
| 1,867,243 | A | * | 7/1932 | Aastrup |
| 2,275,901 | A | * | 3/1942 | Harwood |
| 2,525,585 | A | * | 10/1950 | Brasington |
| 2,562,790 | A | * | 7/1951 | Houston, Jr. |
| 2,789,798 | A | * | 4/1957 | Brace |
| 2,811,338 | A | * | 10/1957 | Beam |
| 3,224,743 | A | * | 12/1965 | Freedman et al. |
| 3,630,494 | A | * | 12/1971 | Patton |
| 4,325,643 | A | * | 4/1982 | Scott et al. |
| 4,403,867 | A | * | 9/1983 | Duke |
| 4,479,720 | A | * | 10/1984 | Mochida et al. |
| 4,919,539 | A | * | 4/1990 | Drocco |
| 5,236,263 | A | * | 8/1993 | Friedland |
| 5,524,530 | A | * | 6/1996 | Nijzingh et al. |
| 5,860,736 | A | * | 1/1999 | Brisard |
| 5,911,505 | A | * | 6/1999 | St. John et al. |

FOREIGN PATENT DOCUMENTS

| EP | 126437 | * 11/1984 |
| GB | 2134000 | * 8/1984 |
| JP | 59-179136 | * 10/1984 |

* cited by examiner

*Primary Examiner*—Charles E. Cooley
(74) *Attorney, Agent, or Firm*—Bacon & Thomas, PLLC

(57) ABSTRACT

A food mixer includes a head (12) that is detachable from a base (11) for use separately in mixing food such as cake ingredients. The turntable motor (25) in the base is controlled by an independent speed control (18). Control (18) and motor(25) receive their power from wires attached to a pair of electrically conductive hooks (32) which serve not only to physically secure the head (12) in position, but also to conduct the electric current.

5 Claims, 1 Drawing Sheet

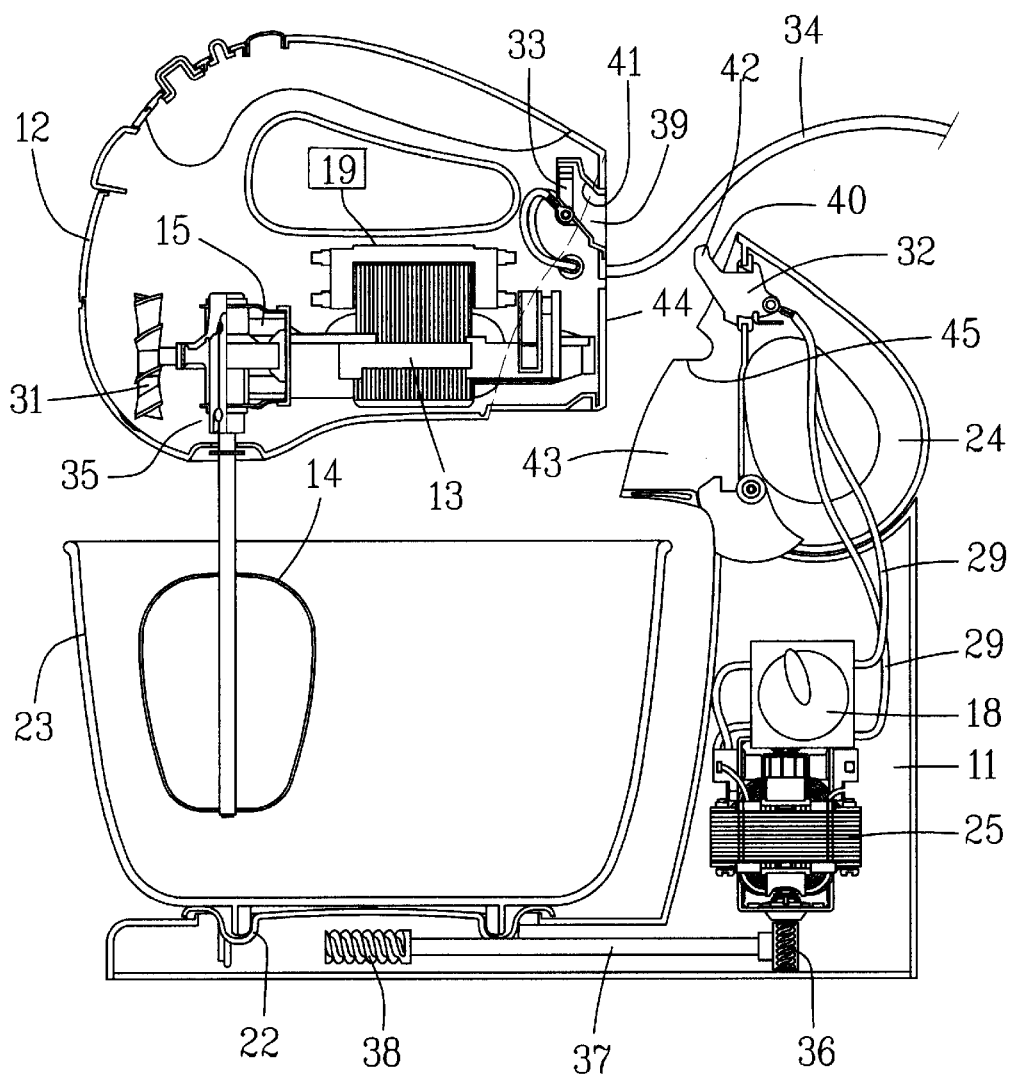

FOOD MIXER WITH DETACHABLE HEAD

BACKGROUND OF THE INVENTION

1. Field of the Invention

The following invention relates to food mixers. More particularly, though not exclusively, the invention relates to mixers typically used for mixing cake ingredients.

2. Description of the Related Art

Such mixers conventionally have a pair of counter-rotating beaters which extend downwardly from a mixing head into a mixing bowl. The beaters are offset from the vertical center axis of the bowl such that upon rotation of the bowl, all of the cake ingredients are blended by the beaters.

Such food mixers include a base having a turntable or carousel upon which the mixing bowl sits. From the base there extends a post upon which there is pivotally mounted a mixing head from which the beaters depend. A powerful electric motor situated within the head is connected by transmission means to the beaters. In some machines, torque output from this motor is also transferred via a mechanical transmission to the base so as to effect rotation of the turntable or carousel. In less expensive machines, the turntable rotates as a result of the interaction of the beaters with the ingredients in the bowl. There is a significant loss of the motor torque in the mechanical transmission from the motor to the base and turntable. For this reason, it is necessary to use an expensive motor having a torque output not only sufficient to drive the beaters through the cake ingredients, but also to overcome mechanical losses in transmission to the turntable.

Also known are hand-held mixers having a pair of counter-rotating beaters depending therefrom. Such devices can be used conveniently by holding the device over a mixing bowl, saucepan or other vessel and maneuvering the drives such that the motor-driven beaters are moved manually about the vessel for thorough mixing. Some such hand-held device can also be used in conjunction with a base having a rotating turntable upon which a bowl sits. Such devices have an auxiliary output shaft from the motor for coupling to a transmission mechanism in the base to effect rotation of the turntable.

These mixers suffer from the same problems as those fixed-head mixers discussed above.

SUMMARY OF THE INVENTION

It is an object of the present invention to overcome or substantially ameliorate at least one of the above disadvantages and/or more generally to provide an improved food mixer.

There is disclosed herein a food mixer having:

a base, a rotatable member mounted to the base for rotating a bowl that might be supported by the base, a first motor for driving said rotatable member and located within the base, a head supported by the base and detachable therefrom to enable hand-held operation of the head, a beater connecting member supported by said head and configured to receive a beater to extend into said bowl that might be supported by the base, a second motor for driving said beater connecting member and located within said head.

Preferably the base and head include connection means providing both mechanical and electrical interconnection of the base and head for use of the food mixer on a bench-top.

Preferably the base and/or the head include a shroud surrounding said connection means to prevent a user from inadvertently contacting the connection means during attachment or detachment of the head from the base.

Preferably in addition to said beater connecting member, said mixer includes another beater connecting member supported by said head and configured to receive a counter-rotating beater.

Preferably the mixer includes a first speed control for adjusting an operational speed of said first motor and a second speed control for independently controlling an operational speed of said second motor.

Preferably the second motor drives a shaft or a belt for transmitting power to said rotatable member.

BRIEF DESCRIPTION OF THE DRAWING

A preferred form of the present invention will now be described by way of example with reference to the FIGURE which is a schematic cross-sectional elevational view of a food mixer.

DESCRIPTION OF THE PREFERRED EMBODIMENT

In the FIGURE of the accompanying drawing there is schematically depicted a food mixer employing a pair of electric motors. The head 12 is detachable from the base 11 for use separately in mixing the ingredients of a bowl, saucepan or other vessel. The head 12 incorporates a beater motor 13 receiving power via an electrical cord 34. Transmission of torque from motor 13 is via a transmission 15 to beaters 14 connected at beater connectors 35. A fan 31 cools the transmission 15 and motor 13.

The head 12 includes a pair of contacts 33 within a safety recess 39. These contacts 33 receive power from cord 34. This is the same source of power that powers motor 13. A speed control switch, dial or series of buttons 19 (shown symbolically as a rectangle) is provided on head 12 for controlling the speed of motor 13.

Within the base 11 there is situated a turntable motor 25 having an independent speed control 18. Speed control 18 and motor 25 receive their power from wires 29 attached to a pair of electrically conductive hooks 32 situated above pivot 24. These hooks 32 serve not only to physically secure the head 12 in position, but also to conduct electric current from recessed contacts 33 with which they individually connect. The hooks 32 can be provided with engagement surfaces 40 that bear against correspondingly shaped surfaces 41 in the safety recess 39. The tip portion 42 of each of the hooks 32 can form the necessary electrical contact with respect to corresponding recessed contacts 33 in the head 12.

In addition to forming the electrical contacts 33 in a safety recess 39, further safety is provided by means of a protective shroud 43 that surrounds the hooks 32 in base 11. The shroud is hollow so as to receive protruding parts 44 of the head 12, but more importantly provides an obstacle to inadvertent user contact with the hooks 32 which would be live by virtue of their contact with electrical contacts 33 during the act of attaching or detaching the head 12 from the base 11. That is, the protective shroud 43 prevents a person from touching the hooks 32 when they are electrically live. The shroud 43 includes a recess 45 through which the cord 34 can pass when the head 12 is attached to base 11.

The motor 25 has a worm gear 36 on its output shaft cooperating with another worm gear 38 upon shaft 37. The worm gear 38 is situated beneath the bowl 23 for engaging with an annular rack or like formation (not shown) formed on the underside of turntable 22.

In use, the head 12 can be lifted from the base 11 whereupon there is no electrical contact between the two components. The head 12 can be used manually to mix the ingredients of a remote bowl, saucepan or other vessel. When it is desired to use the head 12 with a rotating bowl 23, it can be attached to the hooks 32 for both mechanical support and for conveying electric power to motor 25. The speed of beaters 14 can be adjusted by manipulation of the speed control feature (not shown) described above whereas the rotational speed of bowl 23 can be adjusted independently by manipulation of speed control 18. When mixing is finished, the head 12 can be pivoted upwardly whilst maintaining contact with hooks 32 by operation of pivot 24. This will enable the beaters 14 to be removed. Alternatively, the head 12 can be removed from the base 11 for subsequent removal of the beaters 14.

It should be appreciated that modifications and alterations obvious to those skilled in the art are not to be considered as beyond the scope of the present invention. For example, a drive belt can be used instead of a worm gear arranged to rotate the turntable.

I claim:

1. A food mixer comprising:

a base, a rotatable member mounted to the base and adapted for rotating a bowl placed thereupon, a first motor for driving said rotatable member and located within the base, a head supported by the base and detachable therefrom to enable hand-held operation of the head, a beater connecting member supported by said head and configured to receive a beater so that the beater is extendable into a bowl that is supportable by the rotatable member, a second motor for driving said beater connecting member and located within said head, and a connection device for detachably connecting the head to the base, the connection device comprising hooks in the base that are in connection with the first motor, and recessed contacts in the head in connection with a power cord and adapted to detachably receive tip portions of the hooks such that electric power can be conveyed to the first motor in the base when the head is attached to the base, as well as the second motor in the head.

2. The food mixer of claim 1 wherein the base and/or the head include a shroud surrounding said connection device configured to prevent a user from inadvertently contacting the connection device during attachment or detachment of the head from the base.

3. The food mixer of claim 1 where in addition to said beater connecting member, said mixer includes another beater connecting member supported by said head and configured to receive a counter-rotating beater.

4. The food mixer of claim 1 including a first speed control for adjusting an operational speed of said first motor and a second speed control for independently controlling an operational speed of said second motor.

5. The food mixer of claim 1 wherein said first motor drives a shaft for transmitting power to said rotatable member.

* * * * *